United States Patent
Rogers et al.

(10) Patent No.: US 7,037,055 B1
(45) Date of Patent: May 2, 2006

(54) PRODUCT RESTRAINING DEVICE

(75) Inventors: Stephen James Rogers, Glendale, CA (US); Vadim Chernobilsky, Brooklyn, NY (US); Gregory Rudin, Encino, CA (US); Senad Dzaferovic, Pasadena, CA (US); Gregor Dermendzhyan, North Hollywood, CA (US)

(73) Assignee: Hannibal Material Handling, Inc., Los Angeles, CA (US)

( * ) Notice: Subject to any disclaimer, the term of this patent is extended or adjusted under 35 U.S.C. 154(b) by 0 days.

(21) Appl. No.: 10/346,453

(22) Filed: Jan. 17, 2003

Related U.S. Application Data

(60) Provisional application No. 60/349,597, filed on Jan. 18, 2002.

(51) Int. Cl.
  *B60P 3/06* (2006.01)
(52) U.S. Cl. .................. 410/9; 410/121; 410/130; 410/150
(58) Field of Classification Search ............... 248/351, 248/354.1, 298.1, 345.3; 410/8, 9, 121, 104, 410/130, 150, 149
  See application file for complete search history.

(56) References Cited

U.S. PATENT DOCUMENTS

| | | | | |
|---|---|---|---|---|
| 2,806,436 A * | 9/1957 | Johnston | ................. | 410/147 |
| 4,033,268 A * | 7/1977 | Klekar | ................. | 410/149 |
| 4,256,425 A | 3/1981 | Burgess et al. | ................. | 410/149 |
| 4,553,888 A * | 11/1985 | Crissy et al. | ................. | 410/144 |
| 4,650,383 A * | 3/1987 | Hoff | ................. | 410/149 |
| 4,702,653 A * | 10/1987 | Gaulding et al. | ................. | 410/144 |
| 5,104,269 A | 4/1992 | Hardison | ................. | 410/149 |
| 5,167,479 A * | 12/1992 | Bott | ................. | 410/121 |
| 5,192,187 A * | 3/1993 | Sweet | ................. | 410/151 |
| 5,271,481 A * | 12/1993 | Rich | ................. | 182/3 |
| 5,326,204 A | 7/1994 | Carlson et al. | ................. | 410/143 |
| 5,329,858 A * | 7/1994 | Morris et al. | ................. | 105/178 |
| 5,338,137 A * | 8/1994 | Jensen | ................. | 410/146 |
| 5,582,495 A | 12/1996 | Schroeder | ................. | 410/32 |
| 5,688,087 A * | 11/1997 | Stapleton et al. | ................. | 410/150 |
| 5,785,475 A | 7/1998 | Winstel et al. | ................. | 410/146 |
| 6,062,780 A * | 5/2000 | Petelka | ................. | 410/89 |
| 6,074,143 A * | 6/2000 | Langston et al. | ................. | 410/89 |
| 6,247,740 B1* | 6/2001 | Smith | ................. | 296/24.1 |
| 6,524,043 B1* | 2/2003 | Earle et al. | ................. | 410/130 |
| 6,824,341 B1* | 11/2004 | Ehrlich | ................. | 410/150 |

* cited by examiner

*Primary Examiner*—A. Joseph Wujciak
*Assistant Examiner*—J. Lanford
(74) *Attorney, Agent, or Firm*—Michael Zarrabian, Esq.; Myers Dawes Andras & Sherman, LLP

(57) ABSTRACT

A restraining device that is mountable on a track, has an elongated member and an attachment mechanism connected to an end of the elongated member, to mount the member on a track. The elongated member has a tubular core with an upper end and a lower end and a tubular sleeve having an upper-end opening and a lower-end opening. The core is received within the sleeve such that the sleeve is axially movable relative to the core, and the upper end of the core is connected to the attachment mechanism through the upper-end opening of the sleeve. A spring provides spring-loading for the sleeve such that the upper end of the sleeve is urged against the track to resist motion of the elongated member on the track. The attachment mechanism has a mount for slidably mounting the elongated member on the track, and a pivoting joint connected between the elongated member and the mount, such that the pivoting joint allows the elongated member to be pivoted relative to the track.

27 Claims, 10 Drawing Sheets

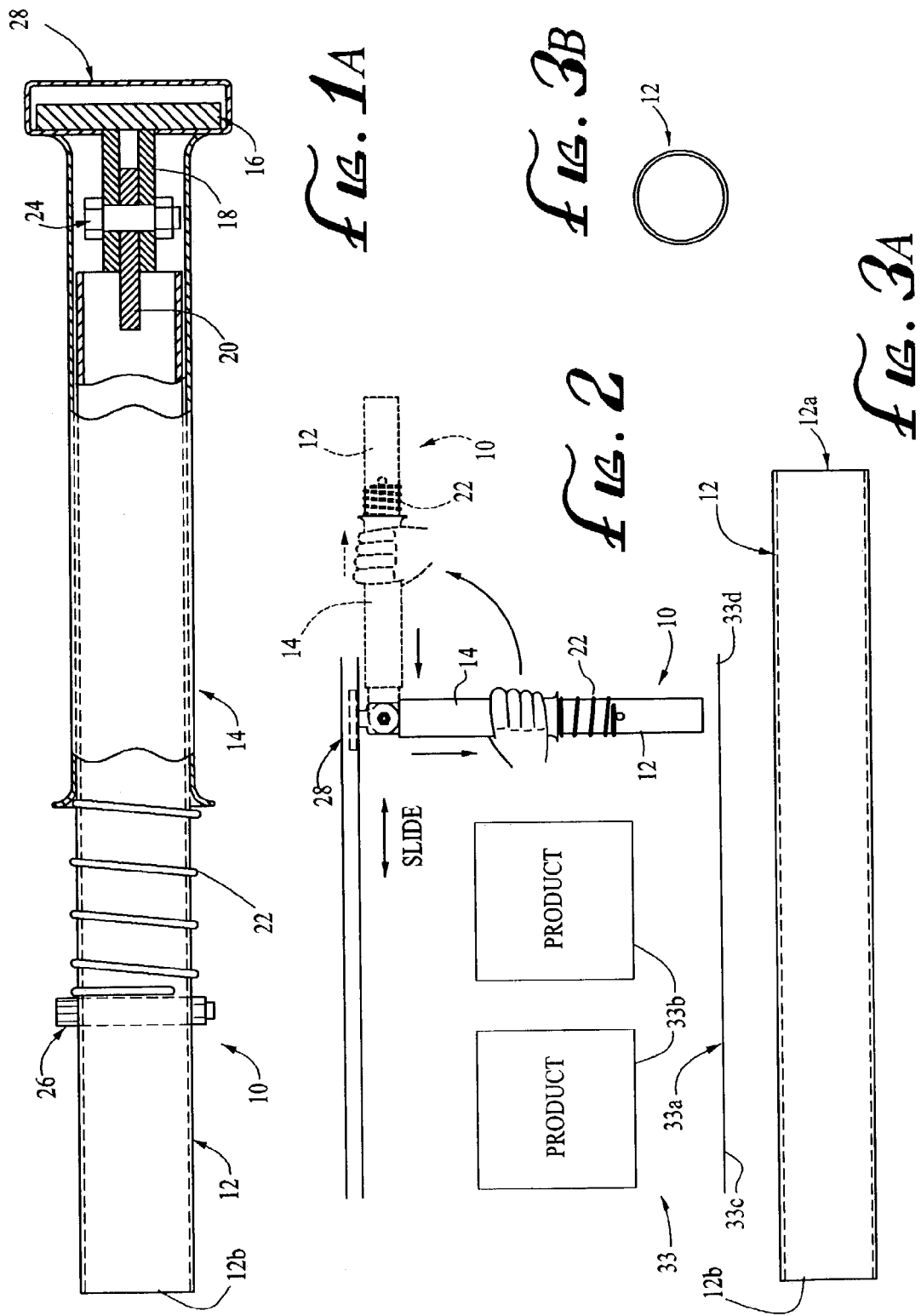

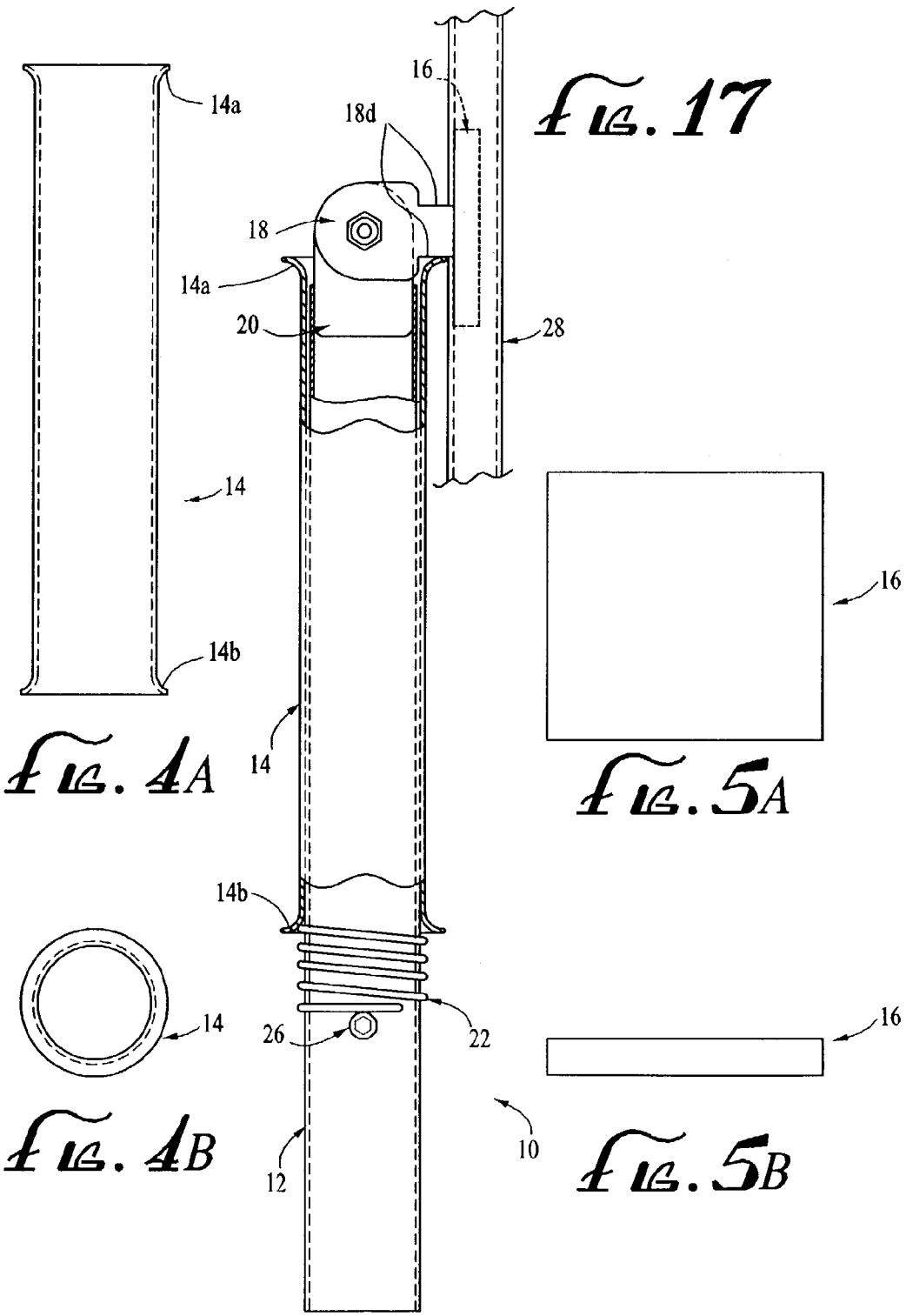

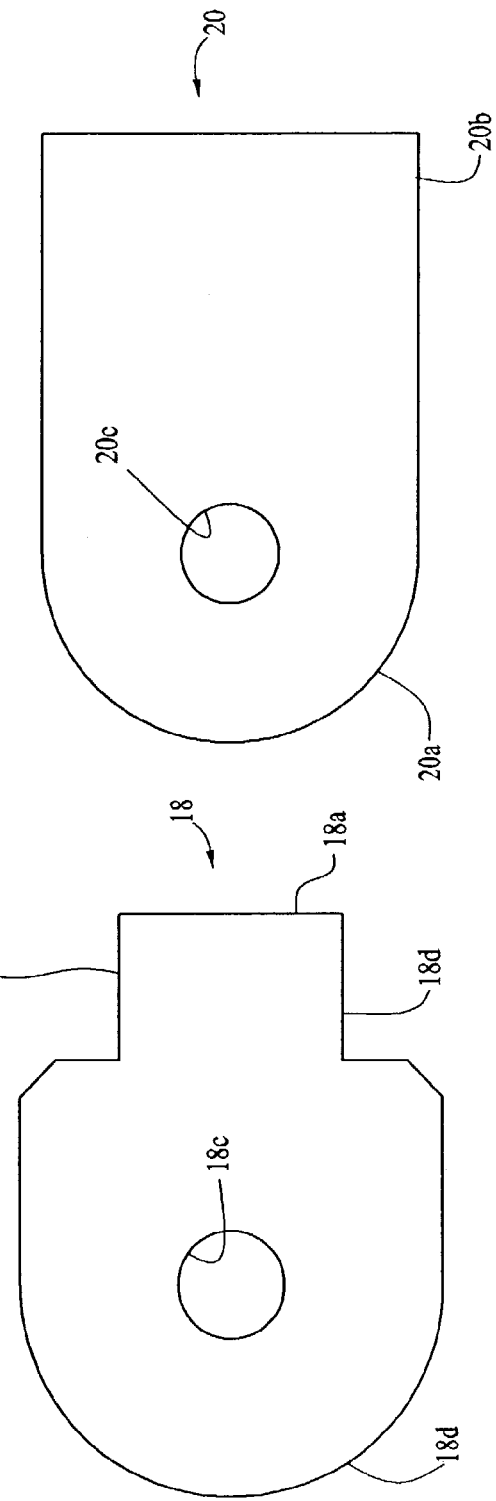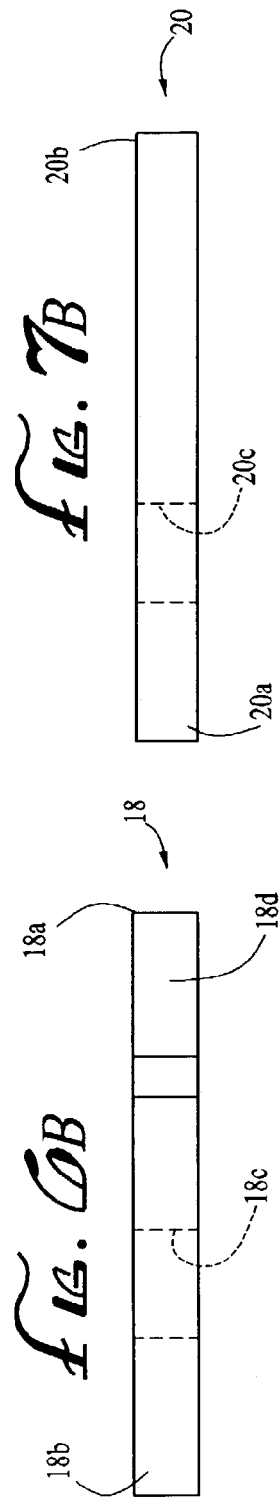

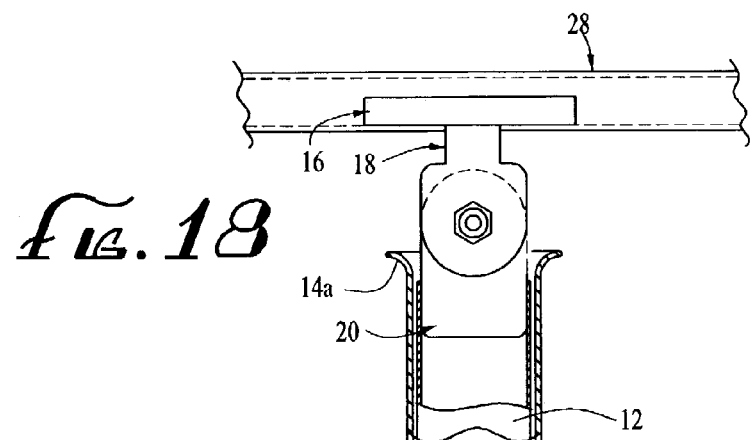
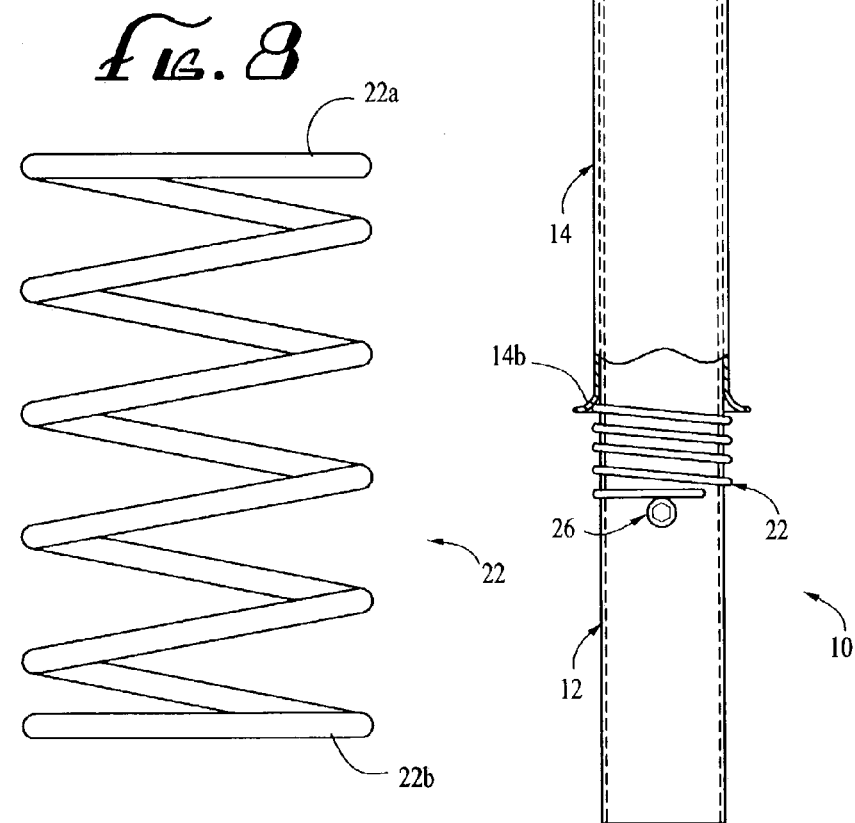

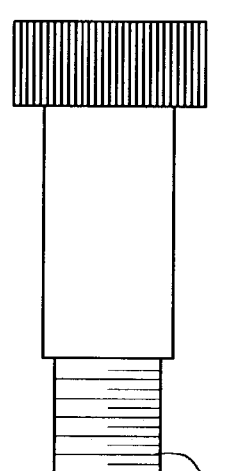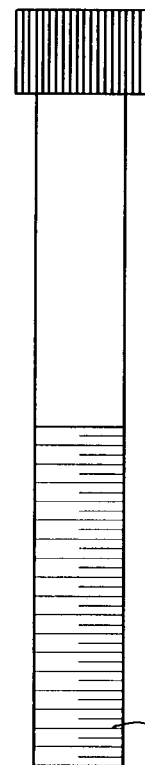

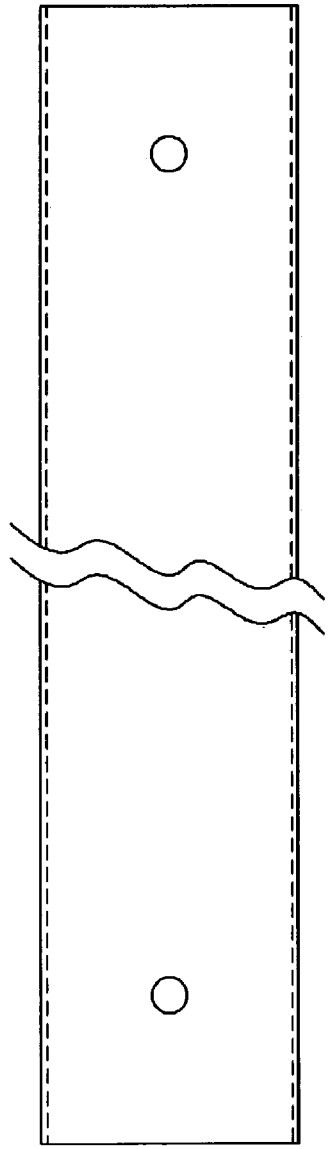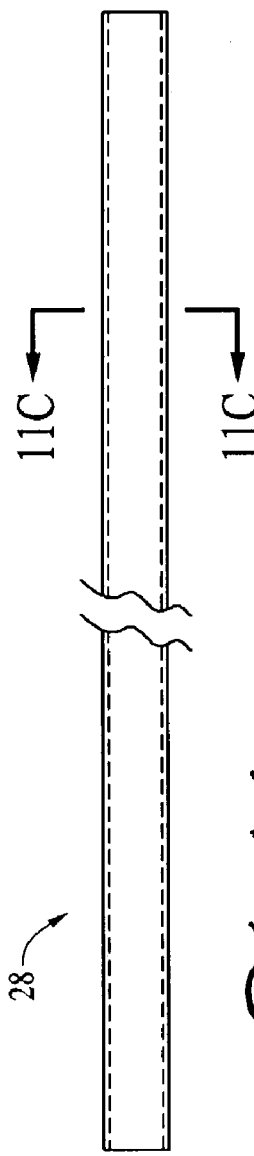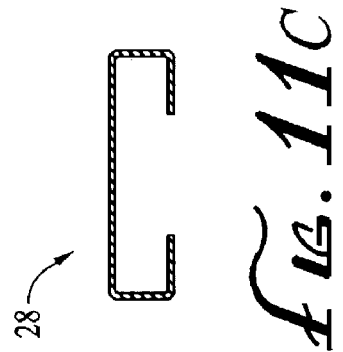

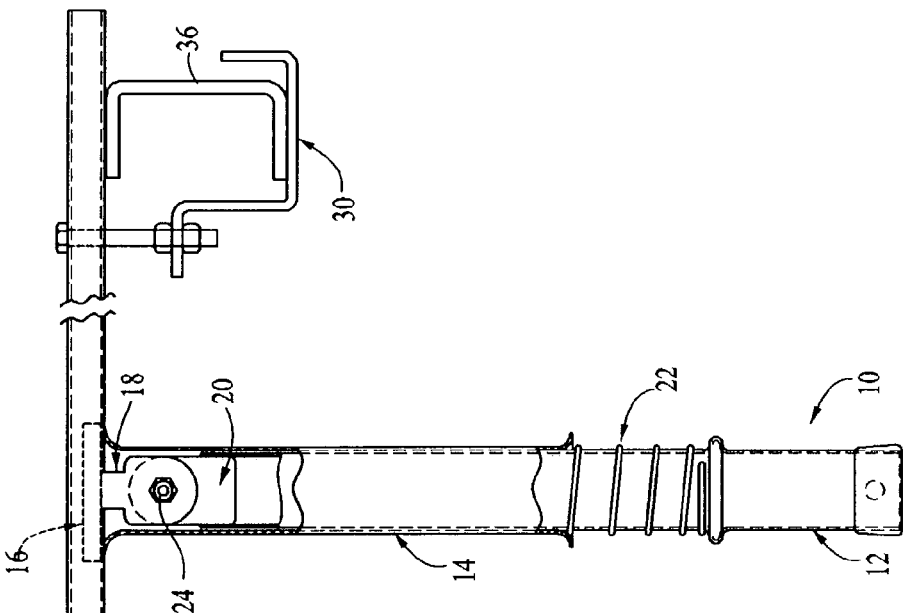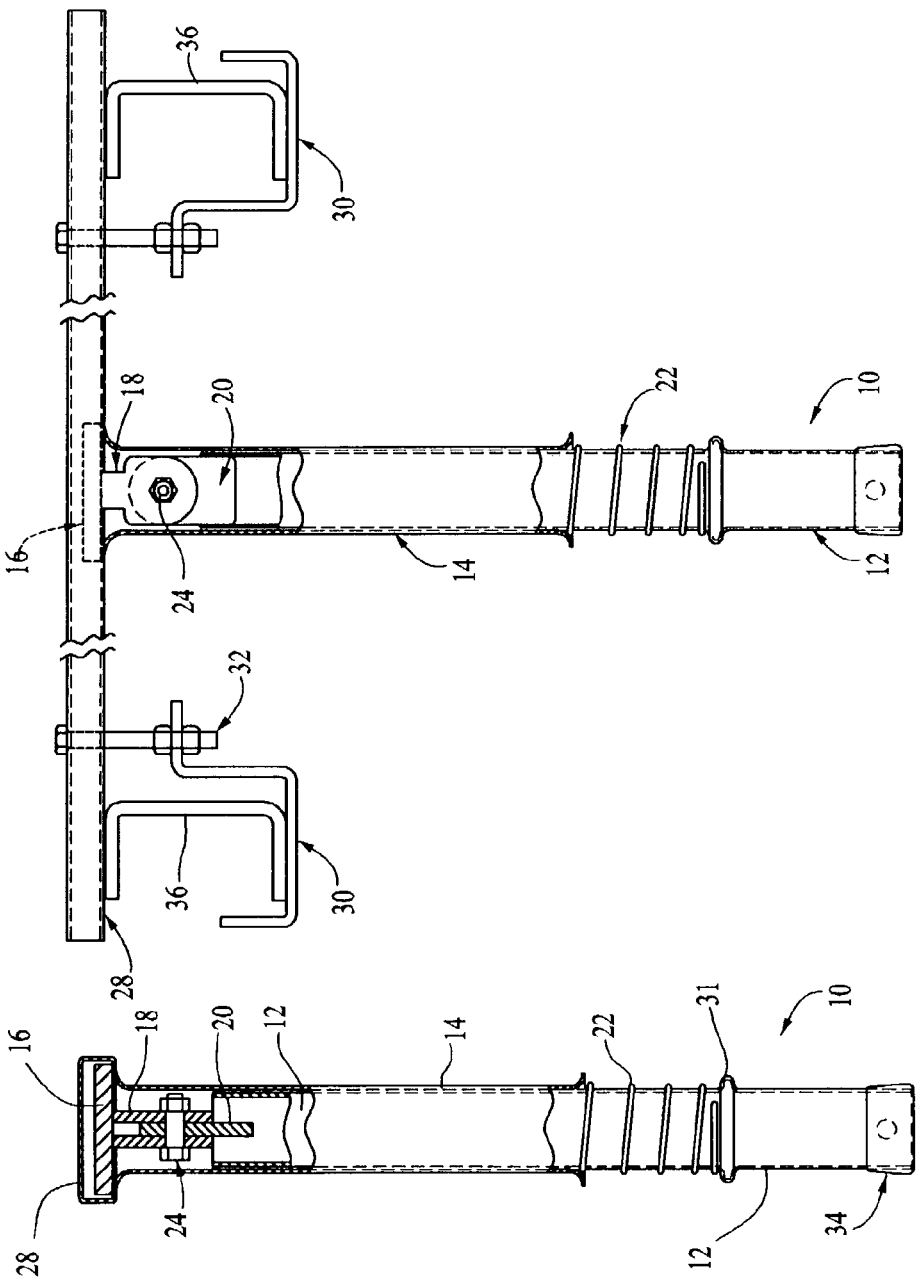

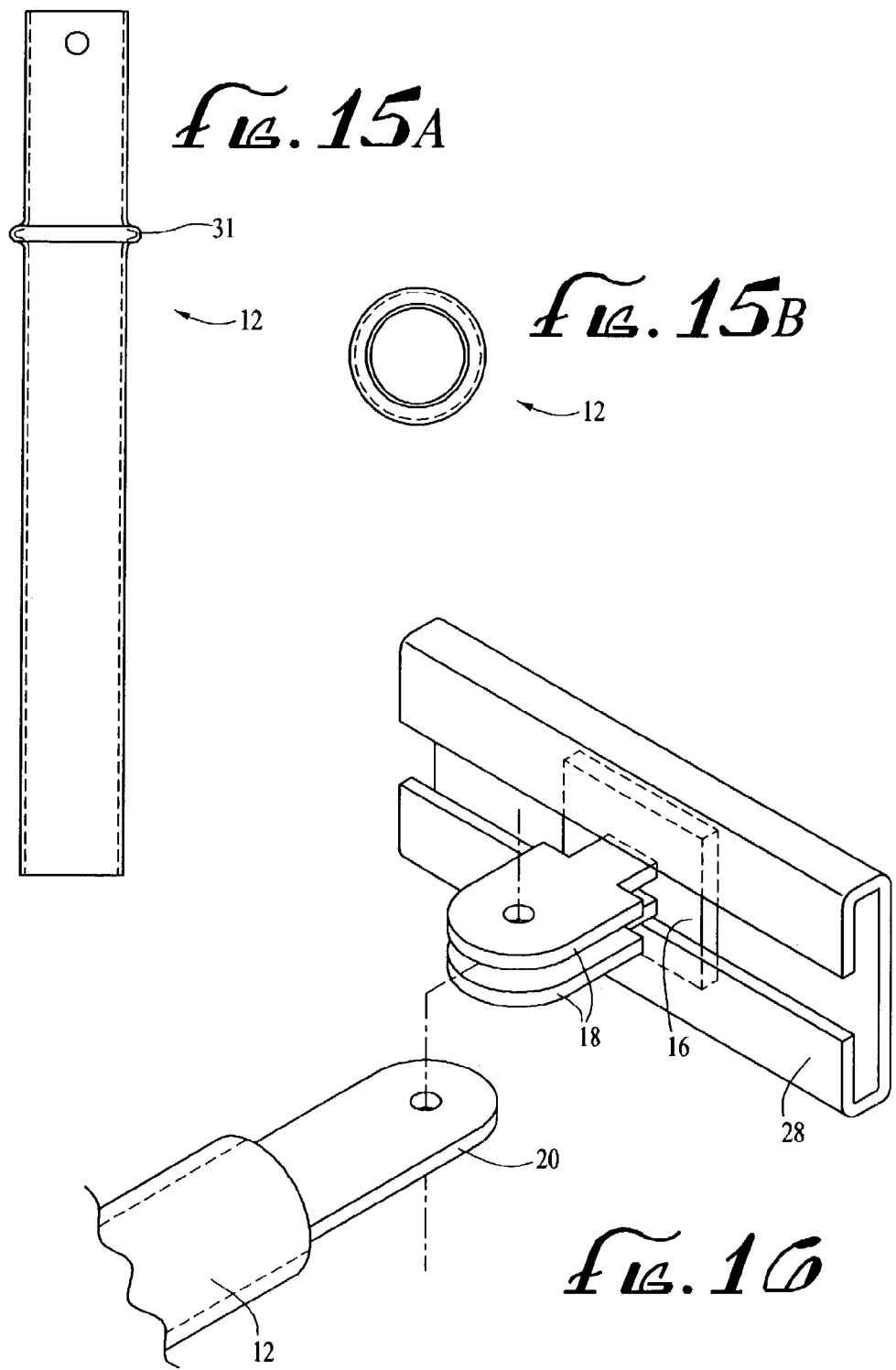

PRODUCT RESTRAINING DEVICE

RELATED APPLICATION

Applicants claim priority of provisional application Ser. No. 60/349,597, for "Product Restraining Device", filed on Jan. 18, 2002, which is incorporated herein by reference.

FIELD OF THE INVENTION

The present invention relates to the field of storage and restraining of products or cargo in storage bays.

BACKGROUND OF THE INVENTION

Restraining devices are used to restrain objects such as products or cargo in storage bays, such as shelves, for storage. Many conventional restraining devices include a netting supported by cable or wire hangers and various types of holders. However, such restraining devices are expensive and difficult to use, requiring many attachments and elaborate, time-consuming, connections.

Other types of restraining devices use removable bars that are placed in a frame to maintain cargo in place for transport. However, such restraining devices require at least two attachments to the frame and must be removed for access. Once removed, such restraining devices can be easily misplaced. Further, in circumstances where implements are needed to prevent products/cargo positioned on tall racks from falling and causing damage and/or injury, existing restraining devices require difficult maneuvering and do not provide a reliable stopping mechanism in the proper position to stop the products/cargo from falling. This can lead to scenarios wherein existing restraining devices are positioned in such a way that they will not function properly to restrain objects on racks in case of accidental dislodgment or seismic events, for example.

There, is therefore, a need for a self-contained restraining device that is easy to operate and functions to safely and reliably maintain objects in storage bays such as on racks in warehouses, stores and transports.

BRIEF SUMMARY OF THE INVENTION

The present invention addresses the above problems. In one embodiment, the present invention provides a restraining device for restraining objects, wherein the restraining device is simple to operate, and prevents objects from falling due to, for example, either seismic events or by dislodgment of the objects by an accidental impact of material handling equipment.

In one example, the restraining device comprises an elongated member and an attachment mechanism connected to an end of the elongated member, to mount the elongated member on a support track. The attachment mechanism includes: a mount for movably mounting the elongated member on the track; a stopper that when engaged resists motion of the elongated member on the track; and a pivoting joint connected between the elongated member and the mount, wherein the pivoting joint allows the elongated member to be pivoted relative to the track.

The mount comprises a slider for slidably mounting the elongated member on the track. The stopper, when engaged, resists sliding motion of the elongated member on the track. The stopper comprises a spring-loaded element that frictionally engages the track. Further, the pivoting joint includes a locking mechanism for maintaining the elongated member in a pivoted position.

In another embodiment, a restraining device according to the present invention, has an elongated member and an attachment mechanism connected to an end of the elongated member, to mount the member on a track. The elongated member has a tubular core with an upper end and a lower end, and a tubular sleeve having an upper-end opening and a lower-end opening. The core is received within the sleeve such that the sleeve is axially movable relative to the core, and the upper end of the core is connected to the attachment mechanism through the upper-end opening of the sleeve. A spring provides spring-loading for the sleeve such that the upper end of the sleeve is urged against the track to resist motion of the elongated member on the track. The attachment mechanism has a mount for slidably mounting the elongated member on the track, and a pivoting joint connected between the elongated member and the mount, such that the pivoting joint allows the elongated member to be pivoted relative to the track.

The restraining device is self-contained and need not be removed to access the objects on a rack, restrained therewith. The restraining device is slidably positioned in a track to block objects positioned on the rack from shifting position and/or falling. The position of the restraining device on the track relative to the objects on the rack can be adjusted using a friction stop, which alleviates the need for exact placement in the track for proper engagement and operation. The restraining device can be pivoted/rotated relative to the track, and includes a locking mechanism to lock it into a pivoted position relative to the track, so that objects can be removed from, or placed on, the rack without removing the restraining device from the track.

BRIEF DESCRIPTION OF THE DRAWINGS

These and other features, aspects and advantages of the present invention will become understood with reference to the following description, appended claims and accompanying figures where:

FIG. 1A shows a front view of an embodiment of a restraining device according to the present invention;

FIG. 2 shows an example operation of rotating the restraining device of FIG. 1B from a vertical position to a horizontal position relative to the top track, FIG. 3A shows side view of a main tube of the restraining device of FIG. 1A;

FIG. 3B shows a cross-section view of the main tube of FIG. 3A

FIG. 4A shows a side view of a sleeve of the restraining device of FIG. 1A;

FIG. 4B shows a top view of the sleeve of FIG. 4A,

FIG. 5A shows a top of a holding plate of the restraining device of FIG. 1B that can be slidably positioned in a top track;

FIG. 5B shows a side view of the holding plate of FIG. 5B;

FIG. 6A shows a view of a yoke of the restraining device of FIG. 1B for attachment to the holding plate;

FIG. 6B shows a side view of the yoke of FIG. 6A;

FIG. 7A shows a view of a bracket for the yoke of the restraining device of FIG. 1B;

FIG. 7B shows a side view of the bracket of FIG. 7A;

FIG. 8 shows a side view of a spring in the restraining device of FIG. 1B;

FIG. 9 shows a side view of a shoulder bolt and nut in the restraining device of FIG. 1B;

FIG. 10 shows a side view of a spring stop in the restraining device of FIG. 1B;

FIG. 11A shows a bottom view the top track for the restraining device of FIG. 1B;

FIG. 11B shows a side view the top track of FIG. 11A;

FIG. 11C shows a cross-section view of the top track of FIG. 11B;

FIG. 14A shows a front view of another embodiment of a restraining device according to the present invention;

FIG. 14B shows a side view of the restraining device of FIG. 14A slidably positioned in a top track, illustrated in a vertical position relative to the top track; and FIG. 15A shows a side view of a main tube of the restraining device of FIG. 14B;

FIG. 15B shows a top view of the main tube of FIG. 15A;

FIG. 16 shows an example mechanism for slidably positioning the restraining device of FIG. 1B in a top track;

FIG. 17 shows the restraining device of FIG. 1B illustrated in a rotated, horizontal position relative to the top track; and FIG. 18 shows a side view of the restraining device of FIG. 1B with the sleeve pulled down to clear the track and allow sliding and/or pivoting the restraining device relative to the track.

In the drawings, like elements have like reference numbers.

DETAILED DESCRIPTION OF THE INVENTION

Figure 1B:
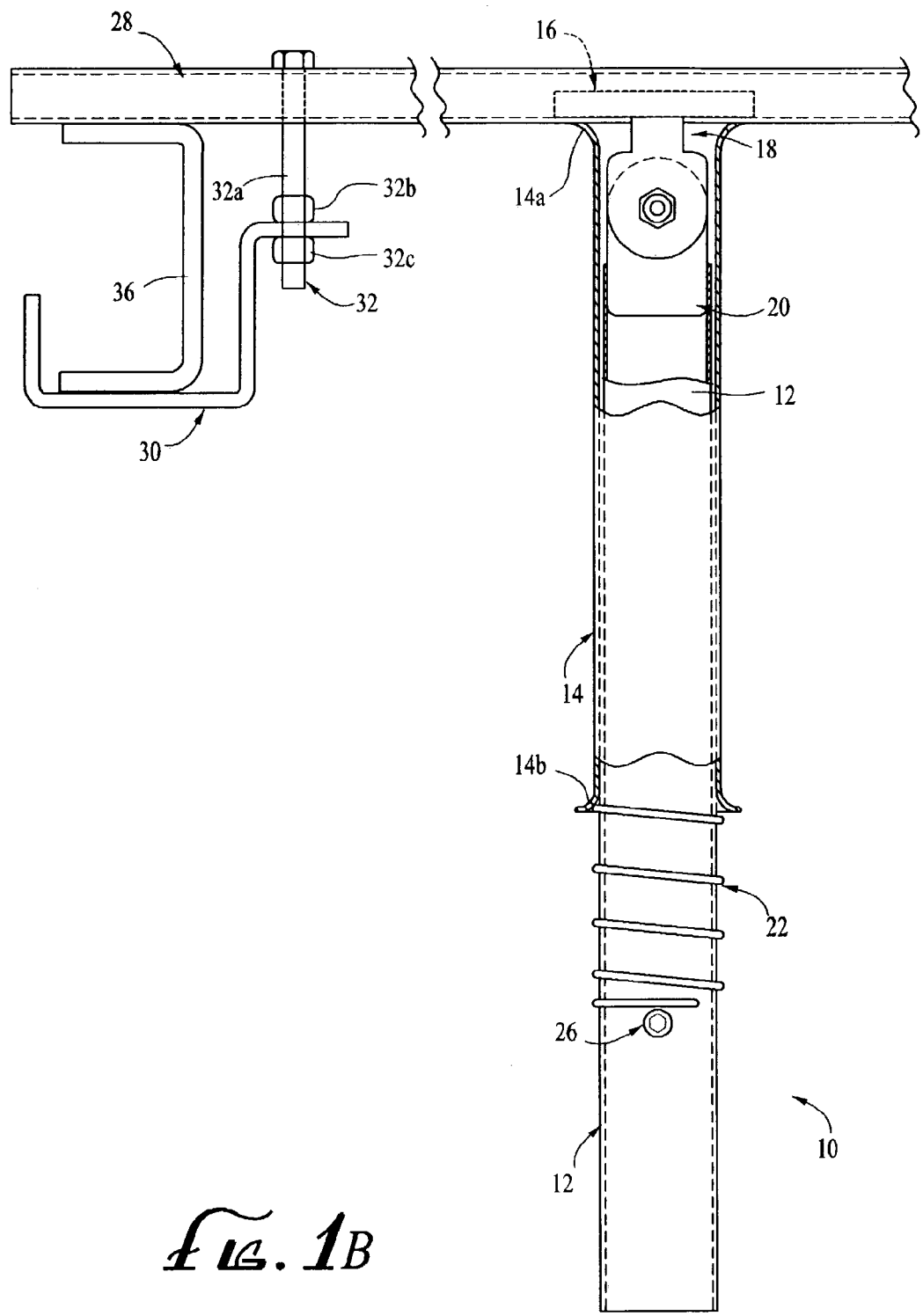
FIG. 1B shows a side view of the restraining device of FIG. 1A as slidably placed in a top track.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

As noted above, in one embodiment, the present invention provides a restraining device (SLR) for restraining objects that may be e.g., loose or palletized. The restraining device is simple to operate, and prevents objects from falling from storage bays/racks due to either seismic events or by dislodgment by accidental impact or by equipment such as lifts.

As shown in FIGS. 1A–B, an example restraining device 10 according to the present invention, includes a substantially cylindrical main tube (core) 12, a cylindrical sleeve 14, a plate 16, a yoke 18, a bracket 20 for the yoke 18, a cylindrical spring 22, a shoulder bolt 24 and a spring-stop 26. FIG. 3A shows a side view of the main tube 12 and FIG. 3B shows a cross-section view of the main tube 12. In one example, the restraining device 10 is assembled by positioning the spring-stop 26 along the length of the main tube 12 at a desired position, such that at least a portion of the spring-stop 26 protrudes from the periphery the main tube 12. FIG. 8 shows a side view of the spring 22 and FIG. 10 shows a more detailed view of the spring stop 26 which comprises a nut 26a and bolt 26b, for connection to an opening along the length of the main tube 12. Then the main tube 12 is inserted into an opening at a bottom end 22b of the spring 22, wherein said bottom end 22b of the spring 22 rests against the spring stop 26. The spring stop 26 prevents the spring 22 from sliding down towards the bottom end 12b of the main tube 12 past the spring stop 26.

Then the sleeve 14 is slidably positioned over the main tube 12 such that the bottom end 14b of the sleeve 14 is in contact with the top end 22a of the spring 22. So assembled, the main tube 12, the sleeve 14 and the spring 22 are essentially axially concentric. FIG. 4A shows a more detailed side view of the sleeve 14 and FIG. 4B shows a top view of the sleeve 14.

The diameter of the bottom end 14b of the sleeve 14 is smaller then the diameter of the top end 22a of the spring 22, such that spring 22 is "trapped" between the spring stop 26 and the bottom end 14b of the sleeve 14. Exerting a force on the sleeve 14 to move it down on the main tube 12 towards the bottom end 12b of the main tube 12, compresses the spring 22 and causes the spring 22 to exert an opposing force on the bottom end 14b of the sleeve 14. When the exerting force is remove from the sleeve 14, the spring 22 decompresses (expands) to slide the sleeve 14 back up towards the top end 12a of the main tube 12.

The yoke 18 and the bracket 20 are pivotably connected with the bolt 24, and form a pivot joint. As shown in more detail in FIG. 7A, in one embodiment the bracket 20 has a top end 20a and a bottom end 20b, wherein the bottom end 20b of the bracket 20 is attached to the top end 12a of the main tube 12, such that the sleeve 14 can glide over the bracket 20 as the sleeve 14 moves up the main tube 12. FIG. 7B shows a side view of the bracket 20. In this example, the bottom end 20b of the bracket 20 is partially inserted inside an opening at the top end 12a of the main tube 12 and fixedly connected thereto.

As shown in more detail in FIG. 6A, in one embodiment the yoke 18 has a top end 18a and a bottom end 18b. FIG. 6B shows a side view of the yoke 18. The bottom end 18b of the yoke 18 is pivotally attached to the top end 20a of the bracket 20 by inserting the bolt 24 (FIG. 9) through openings 18c, 20c in the bottom end 18b of the yoke 18 and the top end 20a of the bracket 20, respectively. As shown in FIG. 17, the yoke 18 can pivot relative to the bracket 20. The dimensions of the yoke 18 and the bracket 20 are selected such that the sleeve 14 can glide over them as the sleeve 14 moves up the main tube 12.

FIGS. 5A–B show top and side views of the plate 16, respectively. The plate 16 is attached to the top end 18a of the yoke 18, wherein the plate 16 can be slidably mounted in a track 28 for suspending the restraining device 10 therefrom. FIG. 16 shows another embodiment of the bracket 20 attached to the main tube 12, and the yoke 18 attached to the plate 16, wherein the plate 16 is slidably mounted in the track 28. FIGS. 11A–C show bottom, side and cross-section views the top track 28, respectively.

Figure 12A:
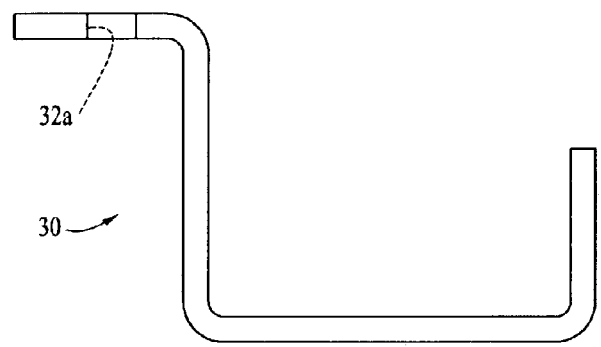
FIG. 12A shows a side view of a beam clamp for holding the top track of FIG. 1B.
Figure 12B:
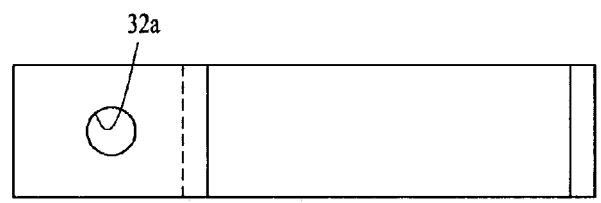
FIG. 12B shows a top view of the beam clamp of FIG. 12A.
Figure 13:
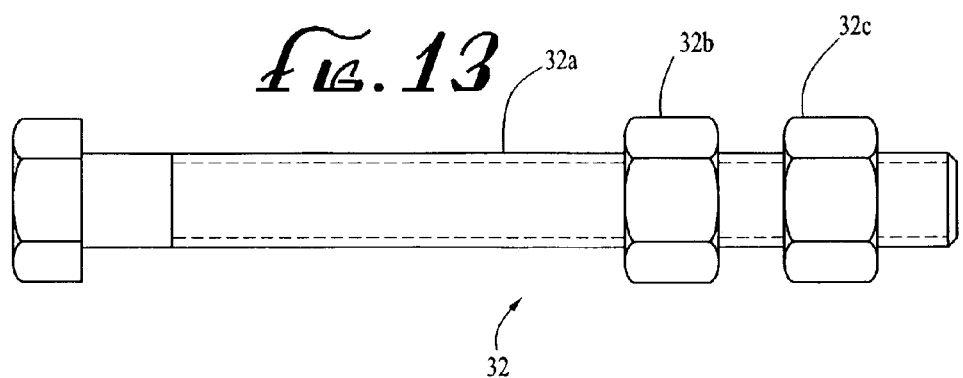
FIG. 13 show a side view of a beam clamp bolt for the top track of FIG. 1B.

The restraining device 10 is shown in FIGS. 1B and 2, mounted in the top track 28 of a storage bay/shelf/rack 33. A beam clamp 30 can be attached to the storage bay's upper beam 36 wherein the beam clamp 30 is attached to the track 28 with a clamp bolt 32 for holding the track 28 against the upper beam 36. FIGS. 12A–B show side and top views of the beam clamp 30, respectively. Further, FIG. 13 shows a clamp bolt 32 that includes a bolt 32a and two nuts 32b, 32c, such that the bolt 32a passes through an opening 30a in the beam clamp 30, and the beam clamp 30 is held to the bolt 32a between the two nuts 32b, 32c as shown in FIG. 1B.

As shown by example in FIGS. 1B, 2 and 16, the plate 16 is sized and shaped to be mounted in the track 28 such that the plate 16 can slide in the track 28. The restraining device 10 can slide front to back (e.g., right to left in FIGS. 1A and 2) in the track 28, and vice versa. FIG. 1B further shows that once the restraining device 10 is suspended from the track 28 using the plate 16, expanding pressure from the spring 22 cause the top end 14a of the sleeve 14 to be pushed up against the track 28 and generate a friction stop effect between the top end 14a of the sleeve 14 and the track 28. To slide the restraining device 10 in the track 28, a user can grasp the sleeve 14 with one hand and pull down on the sleeve 14, thereby gliding/sliding the sleeve 14 down the main tube 12 and compressing the spring 22, such that as shown by example in FIG. 1B, the top end 14a of the sleeve 14 moves away from the track 28 in a substantially vertical direction, thereby reducing or eliminating said friction stop effect against the track 28.

As shown in FIG. 2, while still pulling down on the sleeve 14, the user can then slide the restraining device 10 with the same hand by exerting a force on the sleeve 14 in a substantially horizontal direction relative to the track 28 to slide the plate 16 in the track 28 (e.g., shown by the arrow marked "slide" in FIG. 2). Once the plate 16 slides to a desired position in the track 28, the user can then release the sleeve 14, and the spring 22 expands (decompresses) to push the sleeve 14 back up the main tube 12, such that top end 14a of the sleeve 14 comes in frictional contact with the track 28 again and holds the restraining device 10 in the desired position relative to the track 28. Therefore, the position of the restraining device 10 relative to the track 28 can be adjusted using the friction stop effect. This alleviates the need for exact placement of the plate 16 in the track 28 for proper engagement and operation in a storage bay 33 of FIG. 2.

In FIG. 2, a side view of the example bay 33 is shown as having a shelf/rack 33a and the track 28, wherein the restraining device 10 is slidably mounted in the track 28. Objects such as boxed products 33b, are placed on the shelf 33a in a column from the back end 33c of the shelf to the front end 33d of the shelf (i.e., left to right in FIG. 2). The restraining device 10 is then moved in the track 28 as described above, such that it is positioned in front of the boxes 33b, and functions as a stopping mechanism to block and prevent the boxes from shifting position and/or falling off the front end 33d of the shelf 33a.

Referring to FIGS. 1A–B and 2, the restraining device 10 is normally located in the vertical or "restraining" position relative to the track 28 to blocking the boxes 33b from falling off the front end 33d of the shelf 33a. While the restraining device 10 is in the "restraining" position, the restraining device 10 resists sliding in the track 28, and resists rotation towards a horizontal position relative to the track 28, because the sleeve 14 is pushed up against the track 28 by the spring 22. The top end 14a of the sleeve 14 is flared outward from the axis of the sleeve 14 such that the flared-out section of sleeve 14 blocks rotation/pivoting of the main tube 12 towards a horizontal position relative to the track 28.

In effect, the flared-out section 14a acts as a rigid beam in a transverse direction relative to the main tube 12 and relative to the track 28, that is positioned between the sleeve 14 and track 28 to resists/prevent rotation of the main tube 12 in a horizontal direction. By resisting such rotation, the main tube 12 prevents the boxes 33b that push against the restraining device 10 from moving past the restraining device 10 toward the front 33d of the shelf 33a, and are therefore restrained from shifting position and/or falling off.

As shown in FIG. 2, to "open" the restraining device 10, the sleeve 14 is grasped with one hand and pulled down as described above, thereby compressing the spring 22. As the sleeve 14 slides down the main tube 12, when the top end 14a of the sleeve 14 essentially clears the yoke 18 (FIG. 1B), and while still pulling down on the sleeve 14, the user can then exert a rotating force on the sleeve 14 (shown by a curved arrow in FIG. 2) with the same hand. This causes the restraining device 10 to pivot upward relative to the track 28 to a substantially horizontal position (FIG. 17).

Compressing pressure against the spring 22 is maintained by the sleeve 14 while rotating the restraining device 10 upward to the horizontal position. Then the sleeve 14 is released whereby the expanding spring 22 slides the sleeve 14 back to its home position, engaging a "step" 18d in the yoke 18 (FIG. 17), and secures/locks the restraining device 10 in the horizontal position. The restraining device 10 remains in the horizontal position to allow unrestricted access to the previously restrained boxes 33b.

To return the restraining device 10 to the vertical "restraining" position again (FIG. 11B), reverse of the above process is performed. As such, the user grasps the sleeve 12 of the restraining device 10 in FIG. 17, and exerts a force on the sleeve 14 to move it relative to the main tube 12 and compress the spring 22, thereby moving the top end 14a of the sleeve 14 away from the step 18d in the yoke 18. This unlocks the restraining device 10 such that the restraining device 10 can be rotated towards a vertical position as in FIG. 1B.

Therefore, when the restraining device 10 is in the vertical position relative to the track 28 (FIG. 1B), and one or more boxes 33b are to be removed from, or placed into, a storage bay shelf 33a, the user simply pulls down on the sleeve 14 and then rotates (e.g., lifts up) the restraining device 10 from a vertical position to a horizontal position to provide access to the boxes 33b. This maneuver can be accomplished with one hand and requires little strength due to the unique spring action of the restraining device 10. Once a desired box is removed or placed, the restraining device 10 can be easily lowered back into the protective (i.e., vertical) position and automatically locks into place (i.e., sleeve 14 is urged up against the track 28 by the expanding spring 22) when the sleeve 14 is released. As such, the restraining device 10 is self-contained and need not be removed to access the boxes restrained therewith. Further, the restraining device 10 is easy to lock into a horizontal/open position in the track 28, so that boxes can be removed without removing the restraining device 10 from the track 28. Conventional restraining devices do not lock into an open position that allows easy product retrieval as in the present invention. Instead, the conventional restraining parts must be removed from the system, and such parts can be lost.

Other embodiments and variations of a restraining device according to the present invention are possible. For example, FIG. 14A shows another embodiment of the restraining device 10 using a spring stop protrusion 31 that is part of the main tube 12 instead of the spring stop 26 above. The protrusion 31 has the same function as the spring stop 26. Further a end cap 34 is attached to the bottom end of the main tube 12. FIGS. 15A–B show side and top views of this embodiment of the main tube 12, respectively. Further, FIG. 14B shows the restraining device 10 mounted in a track 28, wherein the track 28 is held in place on a beam 36 using a clamp 30 at each end.

If the restraining device 10 requires repositioning closer to the stored products (e.g., for safety purposes), the sleeve 14 is pulled down by hand and while essentially in its vertical position, the restraining device 10 is then pushed along track 28 with the plate 16 sliding in the track 28, and then self-locking into position when the sleeve 14 is released. To provide more room for the stored boxes, the procedure is reversed. The example restraining device 10 shown herein utilizes friction stop on the track 28, and has a back up final stop using the existing storage bay cross beam 36. The spring loaded releasing design provides to easy and simple operation of the restraining device 10. Further, the free sliding friction stop further simplifies ease of operation, encouraging use of the restraining device 10 and decreasing the time and cost of proper positioning of the restraining device 10 relative to the objects to be restrained.

Though cylindrical shapes are used for the main tube 12, the sleeve 14 and the spring 22, as is known to those skilled in the art other shapes and geometries (e.g., rectangular, etc.) are also possible. Further other mechanisms (e.g., ball joint, hinge, etc.) for pivotally attaching the main tube 12 to the plate 16 are possible as is known to those skilled in the art. Though in the drawings, the example restraining device is shown mounted in a track 28 via a plate 16, other mounting mechanisms such as a wheel, etc. in a channel, etc. can also be used. Further, the restraining device can be used for restraining objects in other environments such as for restraining cargo for transport in a vehicle, etc.

In addition, in another aspect, the present invention provides a restraining system that includes one or more restraining devices 10, tracks 28, clamps 30 and bolts 32, for attachment to existing beams 36 of a storage or cargo bay. Such a restraining system protects against products falling off racks in homes, retail and industrial warehouses, transport vehicles, etc. Such a restraining system is inexpensive, easily installed, user friendly, pleasing to the eye and safely restrains the products. The restraining system can be used in multiple applications and can be accessorized to be more product specific. The restraining device 10 can be used in a downward or upward relative position, and requires little strength to operate with simple maneuvering, as described. The restraining system can be made from steel or other material with dimensions that suit each particular application at hand.

The present invention has been described in considerable detail with reference to certain preferred versions thereof, however, other versions are possible. Therefore, the spirit and scope of the appended claims should not be limited to the description of the preferred versions contained herein.

What is claimed is:

1. A restraining device that is mountable on a track, comprising:
   an elongated member;
   an attachment mechanism connected to an end of the elongated member, to mount the member on a track;
   the elongated member including:
      an elongated section having an upper end and a lower end;
      a sleeve section having an upper-end opening and a lower-end opening, wherein the elongated section is received within the sleeve section such that the sleeve section is axially movable relative to the elongated section, and wherein the upper end of the elongated section is connected to said attachment mechanism through the upper-end opening of the sleeve section;
      wherein the sleeve section is spring-loaded such that upper end of the sleeve section is urged against on the track to resist motion of the elongated member on the track.

2. The restraining device of claim 1, wherein the upper end of the sleeve section frictionally engages the track.

3. The restraining device of claim 1, wherein attachment mechanism comprises:
   a mount for movably mounting the elongated member on the track.

4. The restraining device of claim 3, wherein the attachment mechanism further comprises:
   a pivoting joint connected between the elongated member and the mount, wherein the pivoting joint allows the elongated member to be pivoted relative to the track.

5. The restraining device of claim 4, wherein while urged against the track, the sleeve section further resists pivoting of the elongated member relative to the track.

6. The restraining device of claim 5, wherein exerting a force on the sleeve section against the urging action of the spring loading to move and disengage the sleeve section from the track, allows pivoting the elongated member relative to the track.

7. The restraining device of claim 6, wherein releasing said force on the sleeve section when the elongated member is in a pivoted position, causes the upper end of the sleeve section to be urged against a portion of the mount whereby the elongated member is maintained in the pivoted position.

8. The restraining device of claim 7, wherein the mount includes a step thereon to engage the upper end of the sleeve section to maintain the elongated member in said pivoted position.

9. The restraining device of claim 5, wherein exerting a force on the sleeve section against the urging action of the spring loading to move and disengage the sleeve section from the track, allows moving the elongated member in the track.

10. A restraining device that is mountable on a track, comprising:
    an elongated member;
    an attachment mechanism connected to an end of the elongated member, to mount the member on a track;
    the elongated member including:
       a tubular core having an upper end and a lower end;
       a tubular sleeve having an upper-end opening and a lower-end opening, wherein the core is received within the sleeve such that the sleeve is axially movable relative to the core, and wherein the upper end of the core is connected to said attachment mechanism through the upper-end opening of the sleeve; and
       a spring for spring-loading the sleeve such that the upper end of the sleeve is urged against on the track to resist sliding motion of the elongated member on the track.

11. The restraining device of claim 10, wherein the upper end of the sleeve is urged against the track to frictionally resist motion of the elongated member on the track.

12. The restraining device of claim 10, wherein attachment mechanism comprises:
    a mount for slidably mounting the elongated member on the track; and
    a pivoting joint connected between the elongated member and the mount, wherein the pivoting joint allows the elongated member to be pivoted relative to the track.

13. The restraining device of claim 10, wherein:
    the core further includes a spring stop along its length; and
    the spring comprises a coil spring that receives the core, and is positioned between the lower end of the sleeve and the spring stop, such that exerting a force on the sleeve to move the sleeve away from the mount and towards the spring stop further compresses the spring.

14. The restraining device of claim 12, wherein while the sleeve is urged against the track, the sleeve further resists pivoting of the elongated member relative to the track.

15. The restraining device of claim 14, wherein exerting a force on the sleeve against the urging action of the spring to move and distance the sleeve from the track, allows pivoting the elongated member relative to the track.

16. The restraining device of claim 15, wherein releasing said force on the sleeve when the elongated member is in a pivoted position, causes the upper end of the sleeve to be urged against a portion of the mount whereby the elongated member is maintained in the pivoted position.

17. The restraining device of claim 16, wherein the mount includes a step thereon to engage the upper end of the sleeve and maintain the elongated member in said pivoted position.

18. The restraining device of claim 14, wherein exerting a force on the sleeve against the urging action of the spring to move and disengage the sleeve from the track, allows moving the elongated member in the track.

19. A restraining system for restraining objects on a rack system, comprising:
   a track that can be supported by the rack system;
   a restraining device including:
      an elongated member;
      an attachment mechanism connected to an end of the elongated member, to mount the elongated member on the track to restrain objects stored on a rack in the rack system;
      the elongated member including:
         an elongated section having an upper end and a lower end;
         a sleeve section having an upper-end opening and a lower-end opening, wherein the elongated section is received within the sleeve section such that the sleeve section is axially movable relative to the elongated section, and wherein the upper end of the elongated section is connected to said attachment mechanism through the upper-end opening of the sleeve section;
         wherein the sleeve section is spring-loaded such that upper end of the sleeve section is urged against on the track to resist sliding motion of the elongated member on the track.

20. The restraining system of claim 19, wherein the upper end of the sleeve section frictionally engages the track.

21. The restraining system of claim 19, wherein attachment mechanism comprises:
   a mount for movably mounting the elongated member on the track.

22. The restraining system of claim 21, wherein the attachment mechanism further comprises:
   a pivoting joint connected between the elongated member and the mount, wherein the pivoting joint allows the elongated member to be pivoted relative to the track.

23. The restraining system of claim 22, wherein while urged against the track, the sleeve section further resists pivoting of the elongated member relative to the track.

24. The restraining system of claim 23, wherein exerting a force on the sleeve section against the urging action of the spring loading to move and disengage the sleeve section from the track, allows pivoting the elongated member relative to the track.

25. The restraining system of claim 24, wherein releasing said force on the sleeve section when the elongated member is in a pivoted position, causes the upper end of the sleeve section to be urged against a portion of the mount whereby the elongated member is maintained in the pivoted position.

26. The restraining system of claim 25, wherein the mount includes a step thereon to engage the upper end of the sleeve section to maintain the elongated member in said pivoted position.

27. The restraining system of claim 23, wherein exerting a force on the sleeve section against the urging action of the spring loading to move and disengage the sleeve section from the track, allows moving the elongated member in the track.

* * * * *